(12) United States Patent
Boos

(10) Patent No.: US 12,091,291 B2
(45) Date of Patent: Sep. 17, 2024

(54) APPARATUS AND METHOD FOR ASSEMBLING/DISASSEMBLING A MOBILE CRANE BOOM

(71) Applicant: Liebherr-Werk Ehingen GmbH, Ehingen/Donau (DE)

(72) Inventor: Bernd Boos, Mehrstetten (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 316 days.

(21) Appl. No.: 17/592,685

(22) Filed: Feb. 4, 2022

(65) Prior Publication Data

US 2022/0250878 A1    Aug. 11, 2022

(30) Foreign Application Priority Data

Feb. 9, 2021    (DE) ...................... 10 2021 102 919.8

(51) Int. Cl.
  *B66C 23/36*    (2006.01)
  *B60P 1/00*    (2006.01)

(52) U.S. Cl.
  CPC .............. *B66C 23/365* (2013.01); *B60P 1/00* (2013.01)

(58) Field of Classification Search
  CPC ....... B66C 23/365; B66C 23/32; B66C 23/36; B66C 23/54; B66C 23/64; B66C 23/68; B66C 23/70; B66C 23/701; B60P 3/28
  See application file for complete search history.

(56) References Cited

U.S. PATENT DOCUMENTS

| | | | | |
|---|---|---|---|---|
| 3,954,193 A | * | 5/1976 | Whittingham | .......... B66C 23/62 |
| | | | | 212/292 |
| 2018/0065832 A1 | * | 3/2018 | Hanamoto | .............. B66C 23/62 |
| 2019/0010029 A1 | * | 1/2019 | Kawabuchi | ............. B66C 23/54 |
| 2021/0292135 A1 | * | 9/2021 | Meissner | ............... B66C 23/365 |

FOREIGN PATENT DOCUMENTS

| | | | | |
|---|---|---|---|---|
| CN | 107176547 A | * | 9/2017 | ............ B66C 19/00 |
| DE | 11 2016 001 320 T5 | | 12/2017 | |
| JP | 2014-31231 A | | 2/2014 | |
| JP | 2016-199345 A | | 12/2016 | |

* cited by examiner

*Primary Examiner* — Sang K Kim
*Assistant Examiner* — Nathaniel L Adams
(74) *Attorney, Agent, or Firm* — Dilworth & Barrese, LLP

(57) ABSTRACT

The invention relates to an apparatus for assembling and disassembling a mobile crane boom, in particular a telescopic boom, that comprises a support device that is attached or attachable to the mobile crane and/or to a transport vehicle on which the boom can be placed and fixed or locked, a roller cart on which the boom can be placed and that is movably stored or storable on the transport vehicle, and a guide mechanism that is attached or attachable to the transport vehicle and by means of which the roller cart is actively movable in parallel with the longitudinal axis of the boom. The invention further relates to a mobile crane having an apparatus in accordance with the invention and to a method of assembling a boom stored on a transport vehicle to a mobile crane using the apparatus in accordance with the invention.

14 Claims, 7 Drawing Sheets

APPARATUS AND METHOD FOR ASSEMBLING/DISASSEMBLING A MOBILE CRANE BOOM

BACKGROUND OF THE INVENTION

The present invention relates to an apparatus for assembling and disassembling a boom of a mobile crane, in particular a telescopic boom, and to a mobile crane having an apparatus in accordance with the invention, and to a method of assembling a mobile crane boom using the apparatus in accordance with the invention.

Large mobile cranes are often too heavy to be driven ready for operation, i.e. completely equipped, in public road traffic. Elements thus have to be disassembled from the mobile crane and transported separately. One component with a great weight to be considered for disassembly is the boom. This in particular applies to mobile cranes having a telescopic boom that comprises a plurality of telescopic sections stored displaceably in one another and extendable and retractable via one or more telescopic cylinders and that therefore has a large weight of its own (e.g. in the order of magnitude of 40 t).

The assembly and disassembly of the telescopic boom is laborious and time-intensive. Solutions are known from the prior art in this respect in which the telescopic cylinder or cylinders of the telescopic boom is/are used to push the boom from the mobile crane onto a transport vehicle such as a tractor unit having a semi-trailer (and vice versa). It is a disadvantage in this respect that the telescopic cylinder for crane operation necessarily has very large dimensions, i.e. it has a large diameter and requires a very great deal of hydraulic oil for its movement. The hydraulic connection hoses consequently likewise have to have a large cross-section that is, however, not required at all for the simple displacement of the boom during the assembly and disassembly procedures. The hydraulic hoses also have to be relatively long since they have to bridge the total distance between the connector of the auxiliary hydraulics of the mobile crane and the hydraulic connector at the telescopic boom in the transport state on the semi-trailer.

A further known possibility comprises using a special vehicle that is especially equipped for the assembly or disassembly of the boom and that has an integrated mechanism to move the boom to or from the mobile crane. A solution is, for example, known in which a hydraulic cylinder fastened to the load surface of the transport vehicle is used for the horizontal displacement of the boom, with the hydraulic cylinder having a corresponding length to bridge the distance from the mobile crane. It is disadvantageous here that such special vehicles are expensive to manufacture and can only be used for this one purpose.

SUMMARY OF THE INVENTION

It is therefore the object of the present invention to simplify and shorten the assembly and disassembly of the boom in mobile cranes. The required work equipment should furthermore be made less expensive and the expensive work equipment such as the transport vehicle transporting the boom should not only be kept on hand for one single purpose of use, but rather be usable in a variety of ways.

This object is achieved in accordance with the invention by an apparatus having the features herein. Advantageous embodiments of the invention result from the following description.

An apparatus for assembling and disassembling a mobile crane boom is accordingly proposed that comprises the following:
- a support device that is attached or attachable to the mobile crane and/or to a transport vehicle on which the boom can be placed and fixed or locked;
- a roller cart on which the boom can be placed and that is stored or storable, in particular on the side of the support device remote from the mobile crane, movably on the transport vehicle; and
- a guide mechanism that is attached or attachable to the transport vehicle and by means of which the roller cart—and thus the boom placed thereon—is actively movable in parallel with the longitudinal axis of the boom.

The support device can comprise a plurality of elements that are in part arranged or arrangeable on the mobile crane and in part on the transport vehicle.

The movement of the boom from the transport vehicle to the mobile crane or vice versa by means of the roller cart, that is in particular hydraulically drivable, takes place substantially horizontally and requires a much smaller hydraulic volume than the telescopic cylinders installed in the case of a telescopic boom. A simple handling of the apparatus in accordance with the invention thereby results since no over-dimensioned hydraulic lines have to be laid. Alternatively, the roller cart or the guide mechanism can also be electrically drivable so that no hydraulic connector at all is required here.

The components of the apparatus in accordance with the invention associated with the transport vehicle furthermore do not necessarily have to be fixedly installed thereat. It is even advantageous if these components are releasably attached to the transport vehicle, i.e. can be removed therefrom again after use. The transport vehicle, which can be a tractor unit having a semi-trailer, can thereby be used for different purposes or transport purposes after the assembly of the boom on the mobile crane and the disassembly of the components of the apparatus in accordance with the invention. The increases the flexibility of the work equipment and lowers the costs.

The components removed from the transport vehicle are preferably associated with the mobile crane and stowable in special holding or storing means (e.g. storage cases and/or holders). Alternatively, the corresponding holding or storing means can also be provided at the transport vehicle without impairing its multipurpose suitability.

Provision is made in a possible embodiment that the support device comprises a roller block attached or attachable to the mobile crane or transport vehicle and having a roller bearing assembly for mounting and guiding the boom. The boom is stored on the roller bearing assembly that preferably comprises at least two, ideally, however, at least four, rollers so that the boom is roller supported on the displacement of the boom relative to the roller block. The drive forces required for the horizontal displacement of the boom are thereby reduced.

The roller block is preferably arranged (or arrangeable) at the mobile crane, for example at the rear of an undercarriage of the mobile crane. Alternatively, the roller block can also be arranged (or arrangeable) at the transport vehicle, in particular at the rear, that faces the mobile crane during the assembly/disassembly. In the last named case, the boom can be mounted or unmounted on the mobile crane at any desired position of the superstructure relative to the undercarriage.

The roller block is preferably vertically adjustable in the vertical direction, for example by means of one or more hydraulic cylinders that adjust the roller bearing assembly in the vertical direction relative to the fastening of the roller block to the mobile crane. The term "vertical direction" here relates to the case that the mobile crane stands on a horizontal plane.

It is possible due to the vertical adjustability to raise the boom stored on the support device and thus to raise it e.g. from a further support so that the boom is completely roller supported and simply displaceable. The option is further thereby opened up of positioning the boom precisely relative to the mobile crane during assembly so that the connection elements or pins can be placed comfortably. In the disassembly, the pin connection between the articulated connection piece and the luffing ram can be relieved by a raising of the boom placed on the support device so that said pin connection can be released comfortably.

Provision is made in a further possible embodiment that the support device comprises a support block that is attached or attachable to the transport vehicle and that can preferably be moved from a fixing position in which the boom can be placed and/or fixed on the support block into a release position in which the support block does not block a horizontal movement of the boom and vice versa. The fixing position does not necessarily itself have to effect a fixing of the boom here. It can, for example, be able to be established via special fixing elements when the support block is located in the fixing position. The support block is preferably located between the roller block and the roller cart in a rear region of the transport vehicle.

The movement between the release position and the fixing position could take place, for example, by a vertical adjustment of a support of the support block or by traveling and/or pivoting clamp elements or blocks that engage or clamp into or only contact the boom in the fixing position (and form a storage surface, for example). It would alternatively be conceivable that the support block is unmovable and that a separation or release of the boom only takes place by a raising by means of the vertically adjustable roller block.

Provision is made in a further possible embodiment that the guide mechanism comprises a drive unit that is movable along a guide apparatus, with the drive unit preferably being arranged or provided at the roller cart. The guide device preferably extends horizontally along the longitudinal axis of the boom or of the transport vehicle and can be fastened or fastenable to a load surface, e.g. at a semi-trailer. The guide device can comprise rails in which the roller cart is guided.

The drive unit is preferably hydraulically drivable, but can also be electrically driven. The roller cart and thus also the boom stored thereon are traveled relative to the transport vehicle and thus also to the mobile crane by driving the drive unit.

Provision is made in a further possible embodiment that the guide device comprises a pulling means that is attached or attachable along a load surface of the transport vehicle and that is guided via one or more rollers of the drive unit, with at least one of the rollers being actively drivable. Such a drive mechanism is simple to implement and above all fast and easy to be installed and removed again. The pulling means only has to be fastened to corresponding, and possibly anyway already present fastening points of the transport vehicle (at least two, namely at the front and rear at the transport vehicle). The pulling means can e.g. be a rope, a band, or a chain, with all the combinations thereof also being conceivable.

The pulling means, unlike known solutions with hydraulic cylinders, only transfers pulling forces. The cylinder in contrast transfers both pulling forces and compressive forces. When pressurized, the kink loads also have to be considered here. The long cylinder has to be heavier than actually necessary for this reason in such solutions and even further connection points may be necessary to the storage or placement surface to guide the cylinder and to protect it from kinking. The pulling means can in contrast be light, as can the drive unit.

Provision is made in a further possible embodiment that the pulling means is releasably mountable on the load surface of the transport vehicle, preferably via fastening means that are arranged at a front end and a rear end of the load surface. Two fastening points or fastening means can be provided between which the pulling means is tensioned or tensionable. However, a plurality of fastening points can also be provided, e.g. laterally at the front and rear, with the pulling means that can extend centrally along the load surface preferably branching (e.g. as a Y branch) at the ends to the respective fastening points. The fastening means can be load securing eyes.

Provision is made in a further possible embodiment that the pulling means is or comprises a chain, in particular a hoisting gear chain, that is guided via one or more sprocket wheels of the drive unit, with the chain preferably comprising a tensioning means by means of which the chain can be tensioned. The dead travel at the start of the boom movement can thereby be minimized.

Chain suspensions can be used as the connection elements of the hoisting gear chain such as are disclosed in DE 20 2018 107 005 U1 to which reference is explicitly made here. These connection elements can thus each have two or three chain strands having balance rockers. A simple change between different transport vehicles can furthermore be made possible in accordance with a special solution by means of hook-like claw elements (for a flexible shortening of the chain strands by hooking the chain links into the hooks). The ends of the possibly shortenable chain strands can be attached to the fastening means or load securing eyes and can be connected to one another via a ring, for example and to the hoisting gear chain extending centrally along the load surface of the transport vehicle.

Provision is made in a further possible embodiment that the drive unit is hydraulically drivable, with a hydraulic line being provided that can be laid by the drive unit to a hydraulic connector of the mobile crane. The hydraulic line preferably is or comprises a flexible hydraulic hose. It can be stored on a hose drum in a windable and unwindable manner. The drive unit is supplied with oil via the hose drum, while the hose drum itself is connected to the hydraulics of the mobile crane.

Since the storing of the boom is preferably completely roller supported by the drive unit during the movement, the required drive forces are very small and only one drive unit provided or configured for this specific purpose exclusively serves as the drive. Due to the small required volume flow of hydraulic oil, the cross-sections of all the hydraulic connectors and of the hydraulic line(s) are small and the elements are thus relatively simple to handle.

Provision is made in a further possible embodiment that the guide mechanism or the drive unit is drivable via a hydraulic system of the mobile crane. The mobile crane therefore serves as the only drive for the apparatus in accordance with the invention. Only the hydraulic oil of the mobile crane is thus used for the drive. After a successful assembly/disassembly, the assembly apparatus is separated from the mobile crane. The separation in particular always takes place in a state in which the hydraulic lines are still filled with oil (the coupling positions enclose the respective oil volume in a leak-safe manner.

If the apparatus is later again mounted on the crane, for example to disassemble the boom, it again drives the apparatus in accordance with the invention with its hydraulic oil and its oil, that is still contained in the apparatus, flows back to the mobile crane again. There is therefore no mixing with older or less high quality hydraulic oil of a different system. With a large amount of oil that circulates in such mobile cranes, this is a substantial cost factor when an oil change becomes necessary.

The present invention furthermore relates to a mobile crane having an apparatus in accordance with the invention. In this respect, the same advantages and properties obviously result as for the apparatus in accordance with the invention so that a repeat description will be dispensed with at this point. The mobile crane preferably has a telescopic boom, with different designs, e.g. a lattice mast boom, also being conceivable and being able to be assembled and disassembled by means of the apparatus in accordance with the invention. The mobile crane can have an undercarriage with a crawler chassis or a wheeled chassis and a superstructure rotatably supported thereon on which the boom can be assembled.

The above described advantage that only the hydraulic oil of the mobile crane is used to drive the drive unit and that no mixing with oil of a different system takes place inter alia results from the fixed association of the apparatus in accordance with the invention with the respective mobile crane.

The present invention furthermore relates to a method of assembling a boom stored on a transport vehicle, in particular a telescopic boom, on a mobile crane while using the apparatus in accordance with the invention. The method comprises the following steps:

Positioning the transport vehicle relative to the mobile crane, in particular by driving the transport vehicle up to the mobile crane or vice versa or both;

releasing the fixing of the boom at the transport vehicle, in particular at the support device;

displacing the boom along its longitudinal axis in the direction of the mobile crane by an active movement of the roller cart, with the boom being roller supported on the support device and the roller cart;

connecting the boom to the mobile crane, in particular by setting the corresponding pins; and luffing up the boom so that it rises from the support device and the roller cart.

In this respect, the same advantages and properties obviously result as for the apparatus in accordance with the invention so that a repeat description will be dispensed with at this point.

The disassembly of the boom from the mobile crane substantially takes place by carrying out these steps in reverse order.

Provision is made in a possible embodiment, of the method that the support device comprises a support block attached to the transport vehicle, with the support block being moved prior to the displacement of the boom from a fixing position into a release position in which the support block does not block a displacement of the boom. The boom is preferably completely roller supported from this time onward.

Provision is made in a further possible embodiment that the support device comprises a roller block that is attached to the mobile crane, that is vertically adjustable, and that comprises a roller bearing assembly for mounting and guiding the boom, with the boom being raised by the roller block such that it can be disassembled. The boom is then initially alone on the roller block The boom can furthermore be movable after a horizontal displacement of the boom at the mobile crane by adjustment of the roller block into an assembly position in which a connection can be established between the boom and the mobile crane. The roller block thus satisfies a dual function.

Provision is made in a further possible embodiment that the guide mechanism comprises a drive unit arranged at the roller cart or integrated therein that is connected to a pulling means, in particular a chain or a hoisting gear chain, attached along a load surface of the transport vehicle, with the roller cart being moved together with the boom in the direction of the mobile crane by driving the drive unit.

Provision is made in a further possible embodiment that the drive unit is hydraulically driven by a hydraulic system of the mobile crane, with a hydraulic connection being established between the drive unit and the hydraulic system of the mobile crane, preferably via a hydraulic hose stored on a hose drum in a windable and unwindable manner after the positioning of the transport vehicle relative to the mobile crane.

BRIEF DESCRIPTION OF THE DRAWINGS

Further features, details, and advantages of the invention result from the embodiments explained in the following with reference to the Figures. There are shown.

DESCRIPTION OF THE PREFERRED EMBODIMENTS

Figure 1:
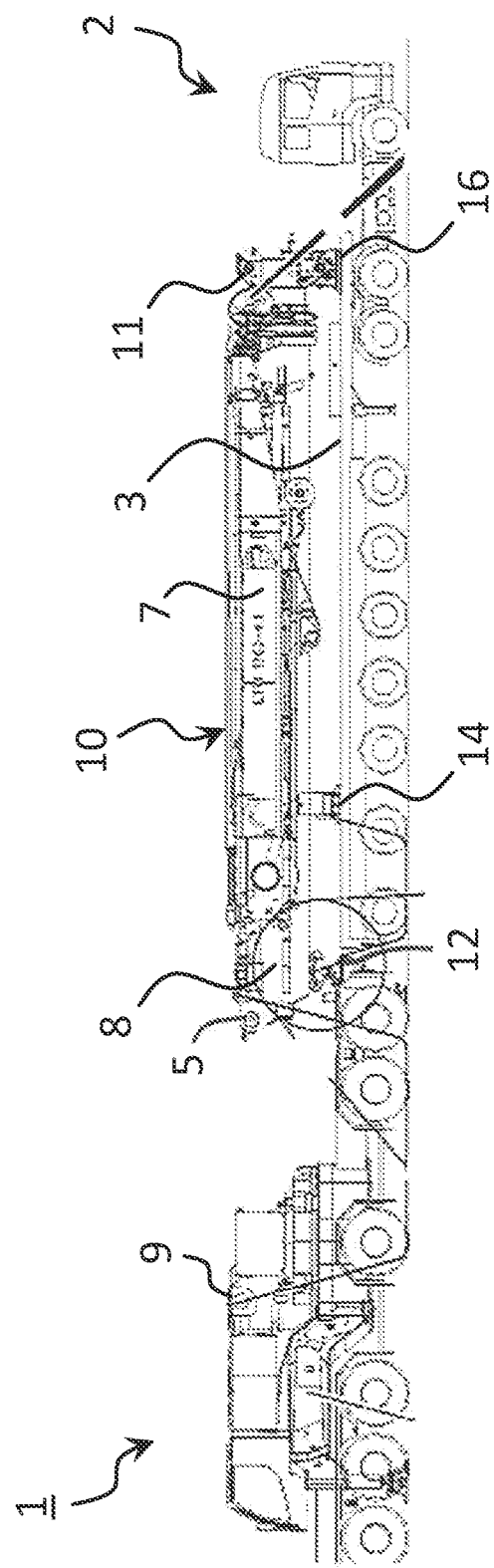
FIG. 1: a side view of a mobile crane and of a transport vehicle with a boom stored thereon in accordance with an embodiment of the invention.

FIG. 1 shows in a side view the rear region of a mobile crane 1 whose telescopic boom 10 has been disassembled and is stored on a transport vehicle 2 in accordance with an embodiment of the invention. The transport vehicle 2 is a tractor unit having a semi-trailer 2 in the present case whose rear region was driven up to the rear of the mobile crane 1 for the assembly/disassembly of the boom 10.

The mobile crane 1 has a drivable undercarriage having a wheeled chassis and a superstructure that is rotatably supported on the undercarriage and on which the boom 10 can be assembled. The mobile crane 1 is secured against toppling over via a support device comprising a plurality of folding or sliding beams 6. The telescopic boom 10 comprises an articulated connection piece 8 in which a plurality of telescopic sections are displaceably stored in one another. The innermost telescopic section has a pulley head 11 at the end. The articulated connection piece 8 has connection means 5 that can be connected by corresponding connection means 9 at the superstructure of the mobile crane 1 to form a pin connection representing the luffing axis of the boom 10. In the embodiment shown here, the boom 10 additionally has a Y guying 7 that contacts the boom 10.

The semi-trailer 2 has a planar load surface 3 on which the disassembled boom 10 is stored via an unmoving support block 14 and a drivable roller cart 16. The pulley head 11 of the boom 10 is connected to the roller cart 16 or lies thereon, while the support block 14 is arranged in the rear region of the semi-trailer 2. The roller cart 16 has a plurality of wheels 26 via which it is travelable or movable on the load surface in the region between the support block 14 and the operator's cabin arranged in the front region of the transport vehicle 2.

The support block 14 arranged at the semi-trailer 2 forms together with a roller block 12 arranged unmovably at the tear of the mobile crane 1 a support device of the apparatus in accordance with the invention. During the transport, the boom 10 lies on the support block 14 and on the roller cart 16 while it also lies on the roller block 12 during the assembly and disassembly procedures.

Figure 3:
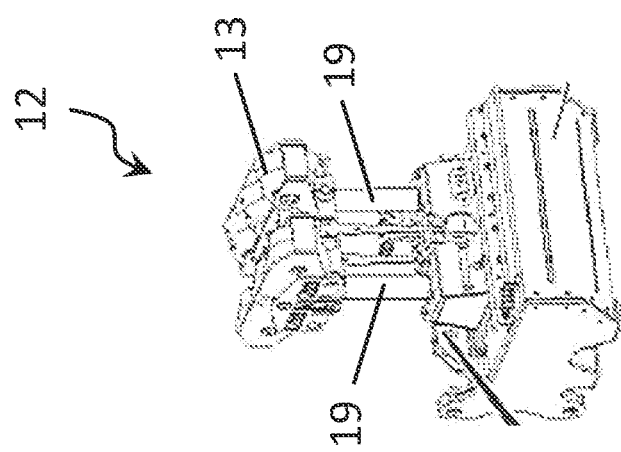
FIG. 3: an enlarged view of the roller block in a perspective view.
Figure 2:
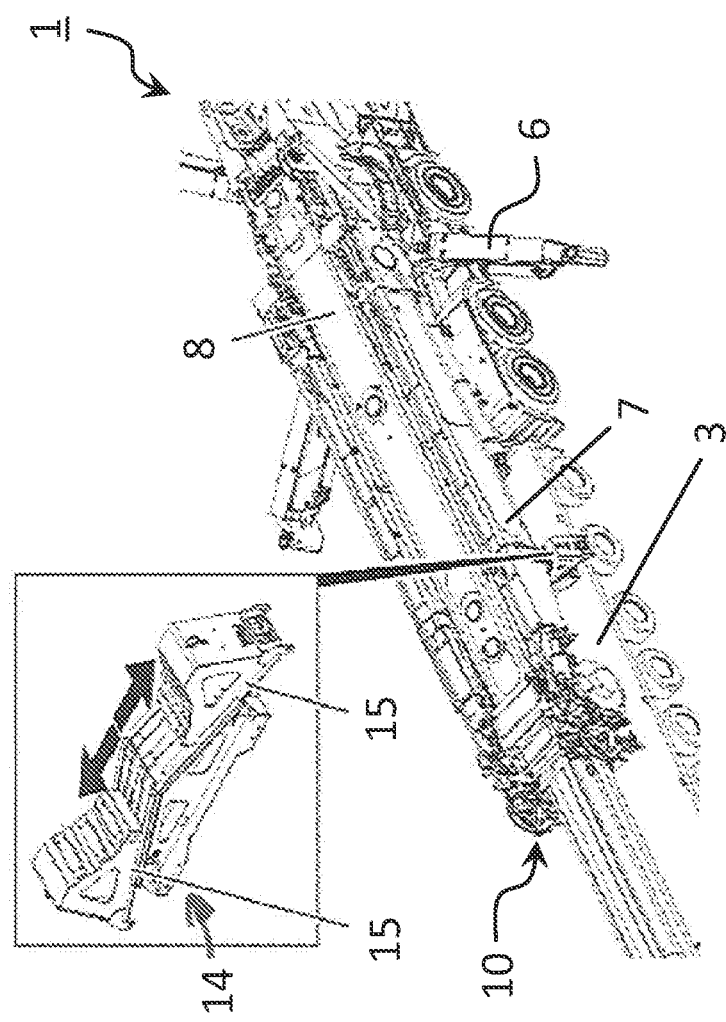
FIG. 2: the mobile crane and the transport vehicle in accordance with FIG. 1 in a perspective view, with the boom being assembled on the mobile crane, with an enlarged representation of the support block.

In FIG. 2, the mobile crane 1 and the semi-trailer 2 are shown in a perspective view, with the boom 10 being mounted on the superstructure of the mobile crane 1. The support block 14 is shown separately in enlarged form here. An embodiment of the roller block 12 can be seen in a perspective view in FIG. 3.

The support block 14 has two chamfered, displaceable blocks 15 that permit an adaptation of the storage surface at the respective boom 10. It is additionally possible to move the support block 14 by moving the blocks 15 apart into a release position in which it does not block or interfere with a horizontal movement of the boom 10.

In the upper region, the roller block 12 has a roller bearing assembly 13 with a plurality of rotatable rollers whose axes of rotation are perpendicular to the horizontal direction of movement or to the longitudinal axis of the boom 10. The roller bearing assembly 13 is vertically adjustable via at least one hydraulic cylinder 19 so that the storage surface for the boom 10 or the boom 10 placed on the roller block 12 can be movable upwardly or downwardly. The hydraulic supply of the cylinders 19 takes place via the hydraulic system of the mobile crane 1. The establishing of the hydraulic connection to the mobile crane 1 can take place, for example, at hydraulic connections of the mobile crane 1 to a sliding beam box that is frequently removed for transport in such a crane, but also at other hydraulic connections of the mobile crane 1.

The apparatus in accordance with the invention provides a simple assembly apparatus that is easy to release from the semi-trailer and comprises a guide mechanism for the horizontal movement of the roller cart 16 and thus of the boom 10 stored thereon. A guide device formed as a hoisting gear chain 20 is tensioned on the semi-trailer for this purpose. The roller cart 16 has a drive unit 18 having a plurality of sprocket wheels 22 24 around which the hoisting gear chain 20 runs.

The use of a hoisting gear chain 20 as a pulling means for guiding and moving the roller cart 16 Is advantageous with respect to its smaller tolerances and the demanded deflection by the sprocket wheels 22, 24 of the drive unit 18. Hoisting gear chains are especially produced for the purpose of the drive and the running around a chain roller for drive purposes and are therefore ideally suitable for the precise displacement of the boom 10 by means of the apparatus in accordance with the invention.

The chain 20 used in the present case is tensioned via a tensioning means formed as a tension lock. The positioning of the roller cart 16 is hereby possible very exactly. A dead travel at the start of the drive movement is minimized. The connection to the semi-trailer 2 takes place via fastening means 4, for example via load securing eyes.

Figure 4:
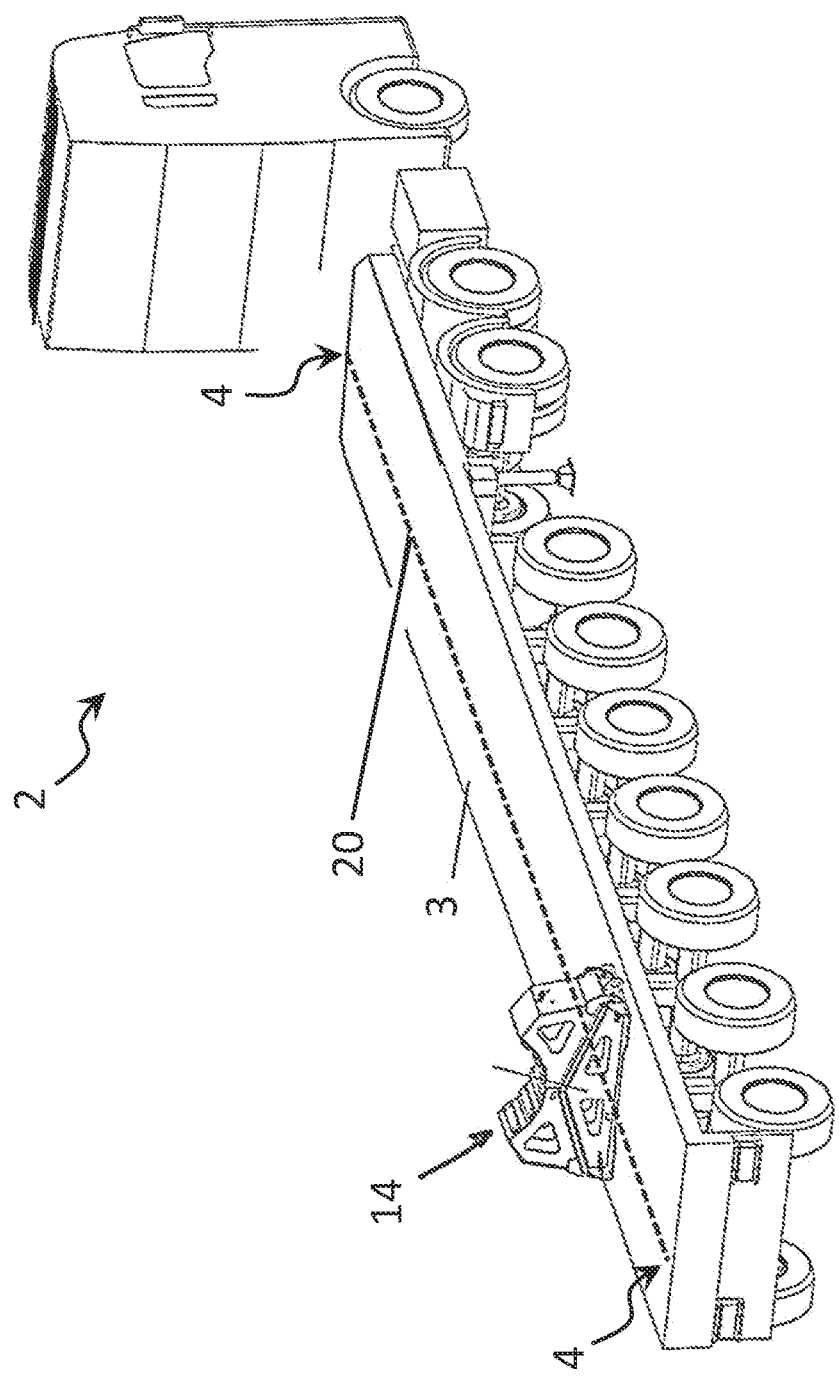
FIG. 4: a schematic view of the transport vehicle to whose load surface a pulling means is attached in accordance with a first embodiment

FIG. 4 shows a first possibility of configuring and arranging the hoisting gear chain 20. The tractor unit with the semi-trailer 2 is shown in a perspective schematic view, with the hoisting gear chain 20 being shown as a dashed line. The chain 20 is tensioned centrally along the longitudinal axis of the semi-trailer 2 and therefore runs in parallel with the direction of displacement of the boom 10. In the embodiment shown here, the hoisting gear drain 20 is tensioned as a linear chain between two fastening means or load securing eyes 4 arranged centrally at the front and rear ends of the semi-trailer 2.

These additional load securing eyes 4 enable a direct and straight-line attachment of the hoisting gear chain 20, which enables a particularly good tensioning of the chain 20 by means of the tension lock. The central load securing eyes 4 arranged centrally in addition to the existing lateral load securing eyes do not impair the universal use of the semi-trailer 2 here.

Figure 5:
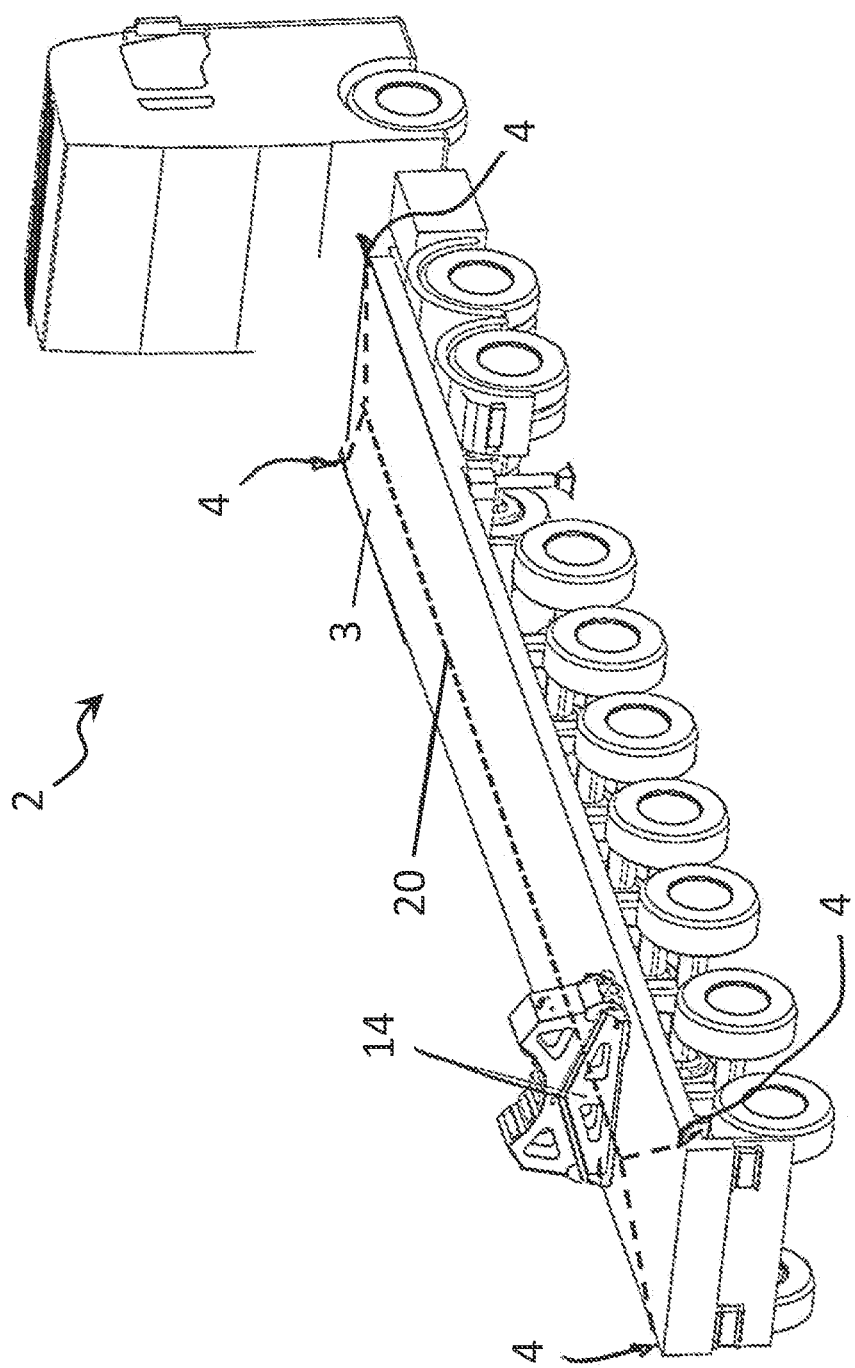
FIG. 5: the view in accordance with FIG. 4 in accordance with a second embodiment.

An alternative embodiment is shown in FIG. 5 in which the hoisting gear chain 20 is fastened to laterally arranged fastening means or load securing eyes 4 at its two ends via connection means or chain strands branching off in Y shape.

Balance rockers such as disclosed in DE 20 2018 107 005 U1 can be provided as connection elements between the centrally running hoisting gear chain 20 and the chain strands connecting the hoisting gear chain 20 to the fastening means 4. Hook-like claw elements can optionally be provided at the balance rockers by means of which the branching chain strands can be reversibly shortened to enable a simple replacement between different transport vehicles. The fact is advantageous in this embodiment that already present laterally arranged load securing eyes 4 can be used for fastening the hoisting gear chain 20. A worse tensioning ability and thus an increased dead travel may, however, result with the double Y shape of the chain formation in comparison with the embodiment in accordance with FIG. 4.

Figure 6:
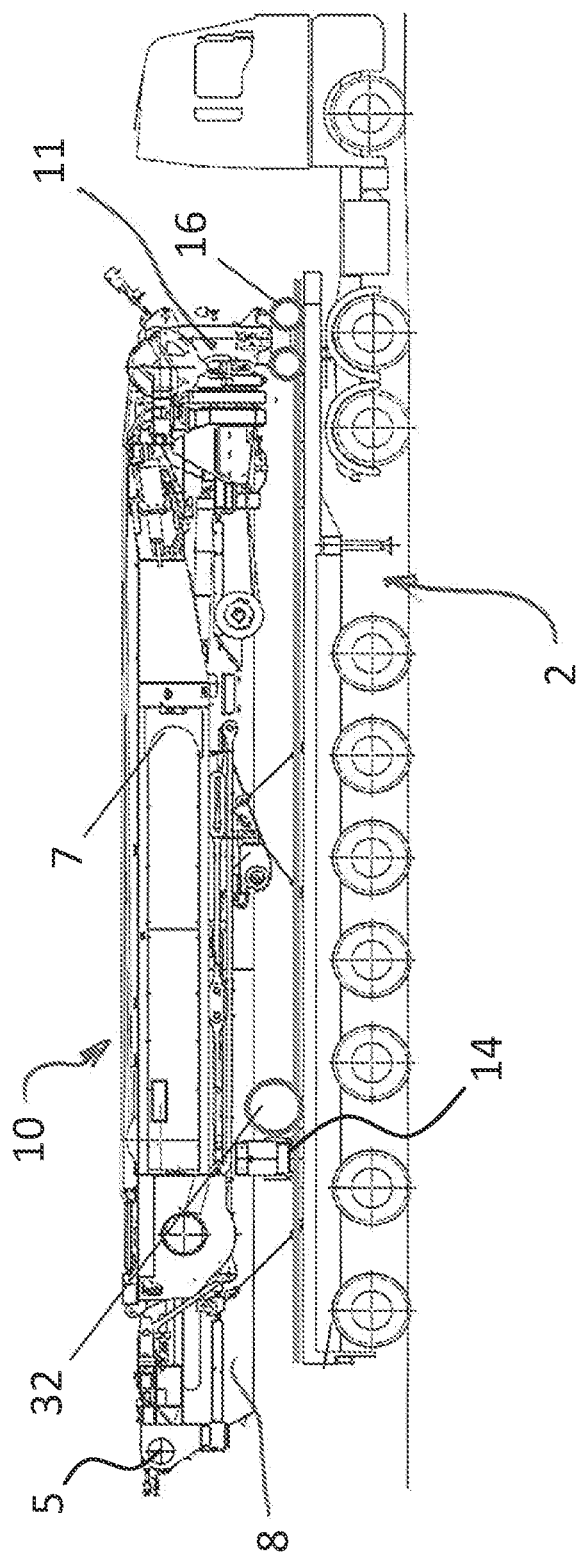
FIG. 6: a side view of the transport vehicle with a telescopic boom stored thereon in accordance with an embodiment, with the roller cart and the hose drum being drawn.
Figure 7:
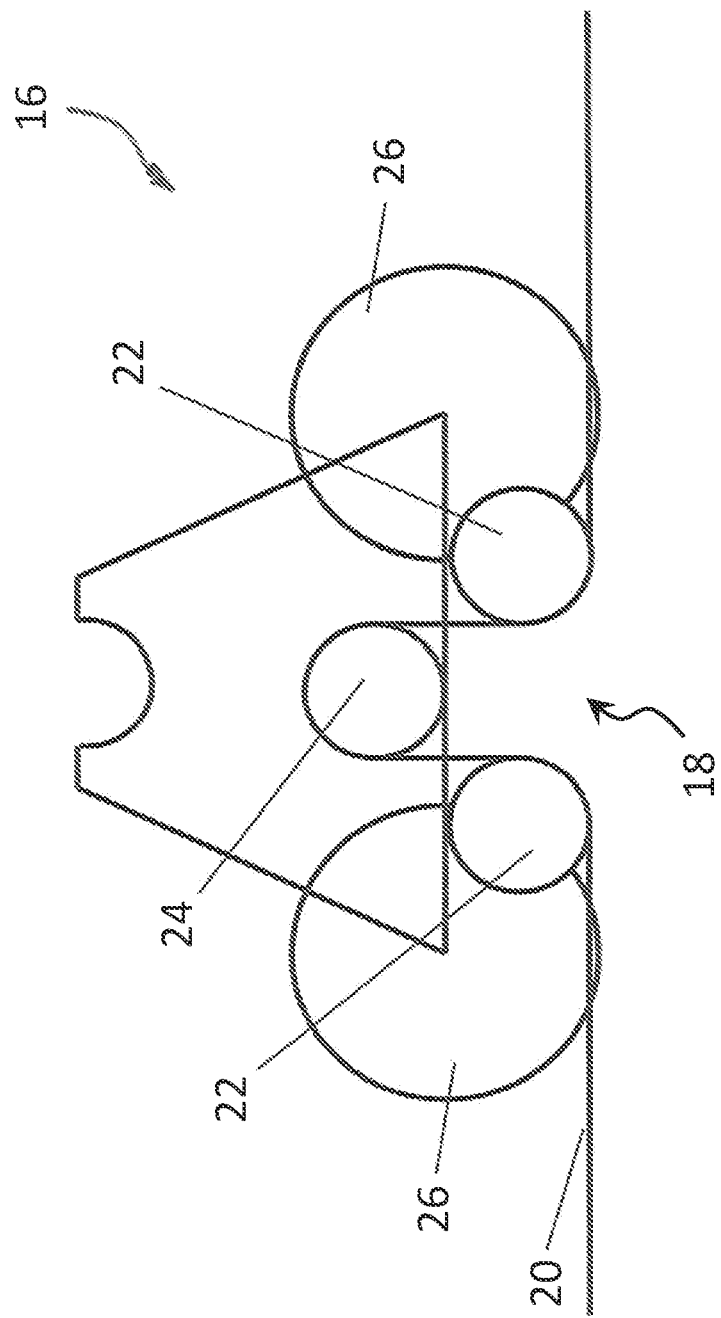
FIG. 7: a first embodiment of the roller cart in a schematic view.
Figure 8:
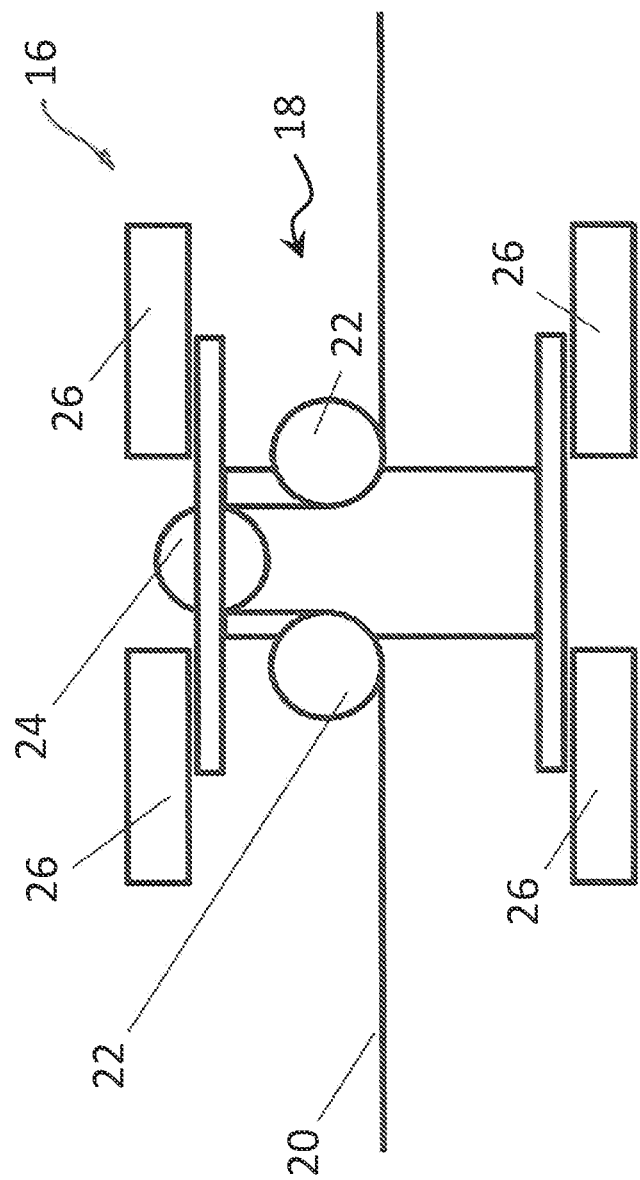
FIG. 8: a second embodiment of the roller cart in a schematic view.

FIG. 6 shows the disassembled boom 10 stored on the semi-trailer 2 in a side view, with the roller cart 16 and a hose drum 32 additionally being drawn in a schematic manner. The roller cart 16 with the drive unit 18 is shown schematically in accordance with two different embodiments in FIGS. 7 and 8, with FIG. 7 showing a side view and FIG. 8 showing a plan view of the roller cart 16.

The horizontal travel movement of the boom 10 is implemented by a chain drive at the front boom support point at the roller cart 16. The pulley head 11 of the boom 10 lies on the roller cart 16 that can travel on the semi-trailer 2. The drive unit 18 having the sprocket wheels 22, 24 about which the hoisting gear chain 20 circulates is integrated in the roller cart 16. The energy supply of the roller cart 16 or of the drive unit 18 takes place hydraulically via connection hoses 30 and a hose drum 32. The hydraulic supply takes place via a connector of the auxiliary hydraulics at the mobile crane 1.

The storage of the boom 10 takes place completely roller supported on the displacement. The required drive forces are thus very small and a drive unit 18 provided or configured only for this purpose serves as the drive. Due to the small required volume flow of hydraulic oil, the cross-sections of all the hydraulic connectors are small and the components are thus simple to handle. It is also possible due to this construction to leave the telescopic boom guying 7 at the boom 10 while it is being removed from the mobile crane 1.

The roller cart 16 is equipped with four wheels 26 (more wheels 26 can naturally be used here). The hoisting gear chain 20 tensioned on the semi-trailer 2 is guided by three sprocket wheels 22, 24 (embodiments having more than three sprocket wheels 22, 24 are also conceivable here), with one of the sprocket wheels 24 ideally serving as the drive due to the largest contact arc. The drive of this sprocket wheel 24 takes place hydraulically via the hose drum 32. The latter is connected to the hydraulics of the mobile crane 1.

The sprocket wheels 22, 24 ideally have a smaller diameter than the wheels 26, which does not, however, necessarily have to be the case. The sprocket wheels 22, 24 also serve to enable a point of entry of the chain into the roller cart 16 that is as deep as possible. A deflection of the hoisting gear chain 20 thus takes place that is as small as possible. The distortion of the chain 20 due to the chain tension that occurs at the end of the movement is namely disadvantageous with such a deflection.

FIG. 7 accordingly shows an embodiment in which the sprocket wheels 22, 24 are arranged such that the hoisting gear chain 20 circulates in a vertical plane, i.e. is deflected upwardly by the first sprocket wheel 22, circulates around the drive wheel 24, and is subsequently deflected back into the horizontal direction by the third sprocket wheel 22. The axes of rotation of the sprocket wheels 22, 24 run in parallel with the axes of rotation of the wheels 26 of the roller cart 16.

Alternatively, a variant is also conceivable having a horizontal drive unit 18, as is shown in FIG. 8. The chain 20 is here deflected within a horizontal plane, i.e. the axes of rotation of the sprocket wheels 22, 24 are perpendicular on the axes of rotation of the wheels 26 of the roller cart 16. The advantage of this embodiment comprises a smaller height of the roller cart 16 since the drive unit 18 can be placed outside the region of the boom head or of the pulley head. This advantage is, however, obtained at the cost of a greater entry of the hoisting gear chain 20 into the roller cart 16.

The hoisting gear chain 20 serves the movement of the roller cart 16 and can only transfer pulling forces. It has at least two connection points 4 to the semi-trailer 2 that are positioned once at the front end and once at the rear end of the storage surface 3. Depending on the direction of movement, that is the disassembly or assembly, one of the ends of the hoisting gear chain 20 transfers the force into the semi-trailer 2 via the load securing eyes 4.

This has a further substantial advantage with respect to the drive via a long cylinder known from the prior art. The cylinder transfers pulling and compressive forces. When pressurized, the kink loads also have to be considered. The long cylinder has to be heavier than actually necessary for this reason and even further connection points may be necessary to the storage or placement surface to guide the cylinder and to protect it from kinking.

An embodiment of a method in accordance with the invention for the assembly of a telescopic boom 10 to a mobile crane 1 will be described in the following:

1. As required: Attaching the roller block 12 to the mobile crane 1 and establishing the hydraulic connection(s) to the mobile crane 1. Alternatively, the roller block 12 can be fixedly mounted on the mobile crane 1.

2. Positioning the semi-trailer 2 having the attached hoisting gear chain 20, the attached support block 14, and the telescopic boom 10 stored on the storage surface 3 relative to the mobile crane 1 and establishing the hydraulic connection(s) between the hydraulic system of the mobile crane 1 (e.g. a hydraulic auxiliary drive) and the hose drum 32 or the drive unit 18 of the roller cart 16. In this respect, in particular the boom 10 is also positioned above the roller block 12.

3. Extending the roller block 12 upward until the roller bearing assembly 13 contacts the boom 10.

4. Releasing all the transport securing devices, in particular releasing the fixing or lock at the support block 14 and establishing the mechanical and other connections between the mobile crane 1 and the semi-trailer 2. This step can also be carried out before step 3.

5. Raising the telescopic boom 10 via the cylinder 19 in the roller block 12, i.e. extending the roller block 12 upward. The telescopic boom 10 here rises from the support block 14. The boom 10 now lies on the roller cart 16 and on the roller block 12, that is it is exclusively roller supported.

6. Moving the support block 14 into the release position so that it is later not in the way of the movement of the telescopic boom 10. Alternatively, an unmovable support block 14 can be used and this step can be dispensed with.

7. Horizontally traveling the roller cart 16 having the total telescopic boom 10 in the direction of the mobile crane 1 along the longitudinal boom axis. The roller cart 16 here rolls on the storage surface 3 and the articulated connection pieces 8 of the boom 10 rolls on the roller bearing assembly 13 on the roller block 12.

8. Optionally, finely aligning the boom 10 relative to the mobile crane 1 by retracting or extending the roller block 1 so that the connection means 5, 9 of the mobile crane 1 and the boom 10 overlap.

9. Establishing the pin connection and all further electrical/hydraulic connections between the mobile crane 1 and the telescopic boom 10 and setting the boom pin at the boom luffing axis 5, 9.

10. Connecting the luffing ram to the boom 10.

11. Luffing up the telescopic boom 10 until its pulley head 11 rises from the roller cart 16 and the articulated connection piece 8 rises from the roller block 12.

12. Releasing the hydraulic connection(s) between the mobile crane 1 and the hose drum 32 or the drive unit 18 of the roller cart 16.

The semi-trailer 2 can now be used for other purposes. In this respect, the pulling means or the hoisting gear chain 20 and/or the roller cart 16 can be removed. The roller block 12 can now likewise be removed from the mobile crane 1.

A corresponding method for the disassembly of the telescopic boom 10 by means of the apparatus in accordance with the invention can be carried out as follows in accordance with an embodiment:

1. As required: Attaching the roller cart 12 to the mobile crane 1 and establishing the hydraulic connection(s) to the mobile crane 1. Alternatively, the roller block 12 can be fixedly mounted on the mobile crane 1.

2. Positioning the semi-trailer 2 having the attached hoisting gear chain and the attached support block 14 relative to the mobile crane 1 and establishing the hydraulic connection(s) between the hydraulic system of the mobile crane 1 and the hose drum 32 or the drive unit 18 of the roller cart 16.

3. Positioning the roller cart 16 in the disassembly position (that is closer to the support block 14 than in the assembly) and moving the support block 14 into the release position so that it is later not in the way of the movement of the telescopic boom 10.

4. Luffing down the telescopic boom 10 until its pulley head 11 is positioned in its intended mount at the roller cart 16 (i.e. it lies on the roller block 12 and on the roller cart 16 after being placed down).

5. Moving the support point 13 at the roller block 12 toward the articulated connection piece 8 of the telescopic boom 10 (i.e. extending the roller block 12 in the direction of the telescopic boom 10) and relieving the pin connection between the articulated connection piece 8 and the luffing ram.

6. Releasing the pin connection and all further electrical/hydraulic connections between the mobile crane 1 and the telescopic boom 10 and releasing the boom pin at the boom luffing axis 5, 9.

7. Horizontally traveling the roller cart 16 having the total telescopic boom 10 away from the mobile crane 1 (i.e. the boom 10 moves away from the mobile crane 1) along the longitudinal boom axis. The roller cart 16 here rolls on the storage surface 3 and the articulated connection piece 8 rolls on the roller bearing assembly 13 on the roller block 12.

8. Closing the rear transport mount, i.e. moving the support block 14 into the fixing position in which the boom 10 can be placed down and fixed on the support block 14.

9. Lowering the telescopic boom 10 via the cylinders 19 in the roller block 12, i.e. retracting the roller block 12. The telescopic boom 10 here lowers onto the support block 14.

10. Establishing all the transport securing devices, in particular establishing the fixing or locking at the support block 14 and severing the mechanical and other connections between the mobile crane 1 and the semi-trailer 2.

The steps listed in the two methods described above do not necessarily have to be carried out in the order given and some of the steps can be carried out together (e.g. steps 3 and 5 of the assembly method).

REFERENCE NUMERAL LIST 1 mobile crane
2 transport vehicle (semi-trailer)
3 load surface/storage surface
4 fastening means (load securing eye)
5 connection means/luffing axis (boom)
6 sliding beam
7 guying
8 articulated connection piece
9 connection means/luffing axis (superstructure)
10 boom
11 pulley head
12 roller block
13 roller bearing assembly
14 support block
15 block
16 roller cart
18 drive unit
19 cylinder
20 pulling means (hoisting gear chain)
22 roller
24 roller (drive roller or sprocket wheel)
26 wheel
30 hydraulic hose
32 hose drum

The invention claimed is:

1. An apparatus for assembling/disassembling a mobile crane boom (10) comprising a support device attachable to a mobile crane (1) and/or a transport vehicle (2) and on which the boom (10) can be placed and fixed;
a roller cart (16) on which the boom (10) can be placed and movably stored on the transport vehicle (2); and
a guide mechanism attachable to the transport vehicle (2) and by which the roller cart (16) is actively movable in parallel with the longitudinal axis of the boom (10) and the boom is thereby displaceable, wherein
the guide mechanism comprises a drive unit (18) movable along a guide device for moving the boom (10) along the longitudinal axis of the boom (10), with the drive unit (18) being arranged on the roller cart (16).

2. An apparatus in accordance with claim 1, wherein the support device comprises a roller block (12) attachable to the mobile crane (1) or transport vehicle (2) and having a roller bearing assembly (13) for mounting and guiding the boom (10), the roller bearing assembly (13) being vertically adjustable in the vertical direction.

3. An apparatus in accordance with claim 1, wherein the support device comprises a support block (14) attachable to the transport vehicle (2) and moved from a fixing position in which the boom (10) can be placed on and/or fixed to the support block (14), into a release position in which the support block (14) does not block a horizontal movement of the boom (10) and vice versa.

4. An apparatus in accordance with claim 1, wherein the guide device comprises pulling means (20) attachable along a load surface (3) of the transport vehicle (2) and guided via one or more rollers (22, 24) of the drive unit (18), with at least one of the rollers (22, 24) being actively drivable.

5. An apparatus in accordance with claim 4, wherein the pulling means (20) is releasably mountable on the load surface (3) of the transport vehicle (2), via fastening means (4) arranged at a front end and a rear end of the load surface (3).

6. An apparatus in accordance with claim 4, wherein the pulling means (20) comprise a hoisting gear chain, guided via one or more sprocket wheels (22, 24) of the drive unit (18), with the chain (20) comprising tensioning means by which the chain (20) can be tensioned.

7. An apparatus in accordance with claim 1, wherein the drive unit (18) is hydraulically drivable, with a hydraulic line being provided that can be laid from the drive unit (18) to a hydraulic connector of the mobile crane (1) and comprises a hydraulic hose (30) stored on a hose drum (32) in a windable and unwindable manner.

8. An apparatus in accordance with claim 1, wherein the guide mechanism is drivable via a hydraulic system of the mobile crane (1).

9. A mobile crane (1) comprising an apparatus in accordance with claim 1.

10. A method of assembling said boom (10) stored on said transport vehicle (2) on said mobile crane (1) using the apparatus in accordance with claim 1, comprising the steps of:

positioning the transport vehicle (2) relative to the mobile crane (1);
releasing the fixing of the boom (10) at the transport vehicle (2) at the support device;
displacing the boom (10) along its longitudinal axis in the direction of the mobile crane (1) by an active movement of the roller cart (16), with the boom (10) being roller supported on the support device and the roller cart (16);
connecting the boom (10) to the mobile crane (1); and luffing up the boom (10) so that it rises from the support device and the roller cart (16).

11. A method in accordance with claim 10, wherein the support device comprises a support block (14) attached to the transport vehicle (2), with the support block (14) being moved prior to the displacement of the boom (10) from a fixing position into a release position in which the support block (14) does not block a displacement of the boom (10).

12. A method in accordance with claim 11, wherein the support device comprises a roller block (12) attached to the mobile crane (1), vertically adjustable, and having a roller bearing assembly (13) for mounting and receiving the boom (10), with the roller block (12) being extended upwardly after the release of the fixing of the boom (10) so that the boom (10) rises from the support block (14), with the boom (10) at the mobile crane (1) being movable by adjustment of the roller block (12) after the displacement into an assembly position in which a connection can be established between the boom (10) and the mobile crane (1).

13. A method in accordance with claim 10, wherein the guide mechanism comprises a drive unit (18) arranged at the roller cart (16) and connected to a chain (20), attached along a load surface (3) of the transport vehicle (2), with the roller cart (16) being moved together with the boom (10) in the direction of the mobile crane (1) by driving the drive unit (18).

14. A method in accordance with claim 13, wherein the drive unit (18) is hydraulically driven by a hydraulic system of the mobile crane (1), with a hydraulic connection being established between the drive unit (18) and the hydraulic system of the mobile crane (1), via a hydraulic hose (30) stored in a windable and unwindable manner on a hose drum (32) after the positioning of the transport vehicle (2) relative to the mobile crane (1).

* * * * *